May 9, 1933. H. NIELSEN 1,908,651
APPARATUS FOR THE DISTILLATION OF SOLID CARBONIZABLE FUEL
Filed June 29, 1929 4 Sheets-Sheet 1
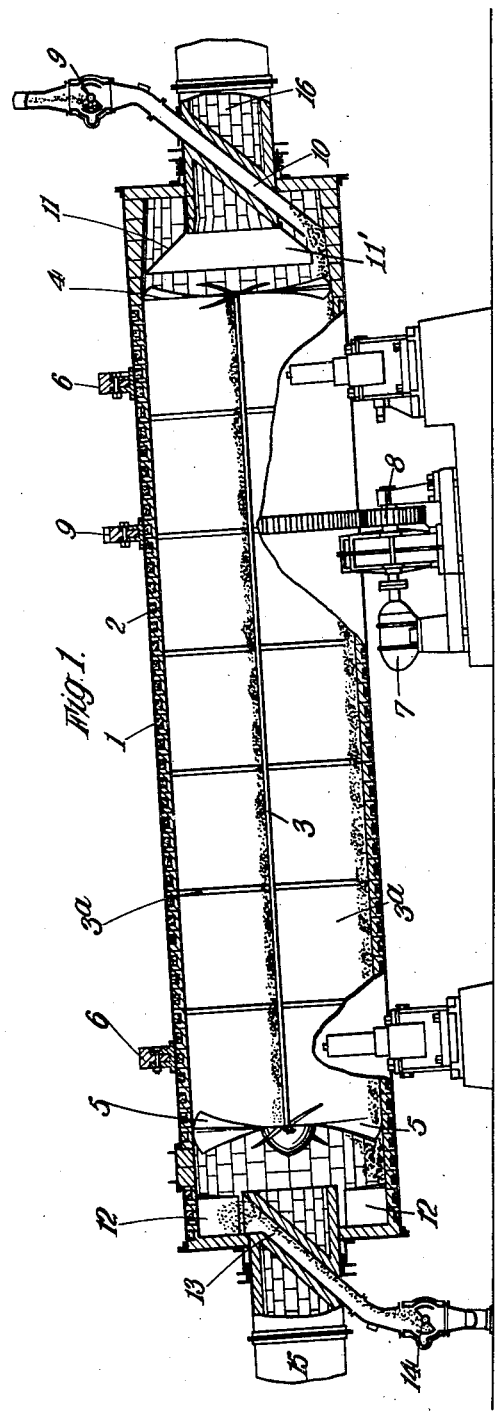

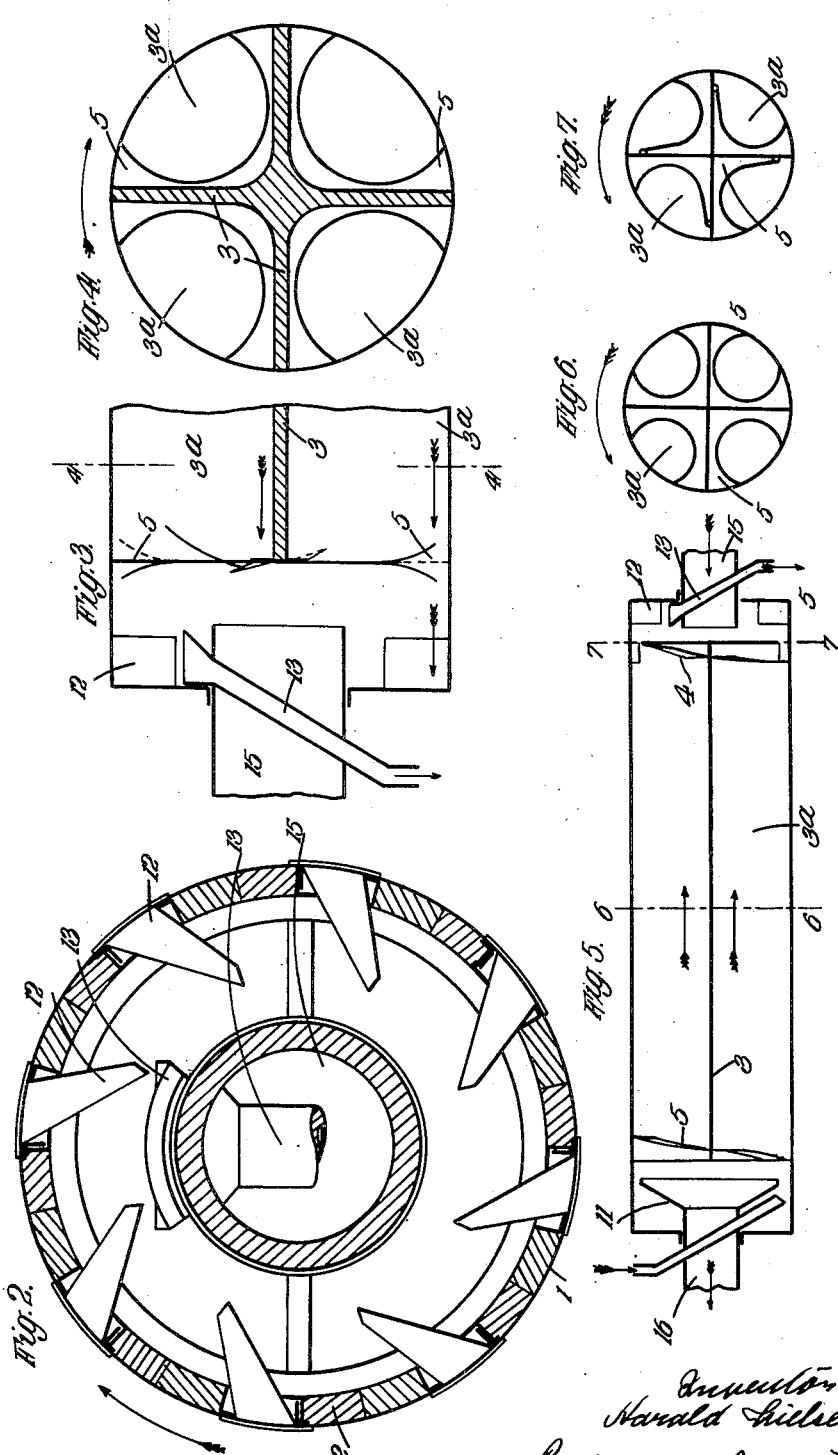

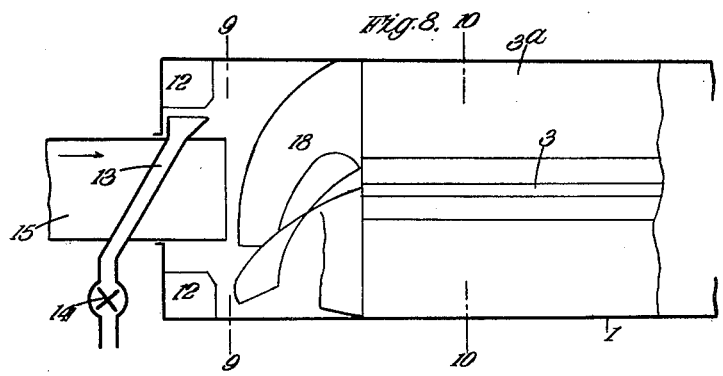
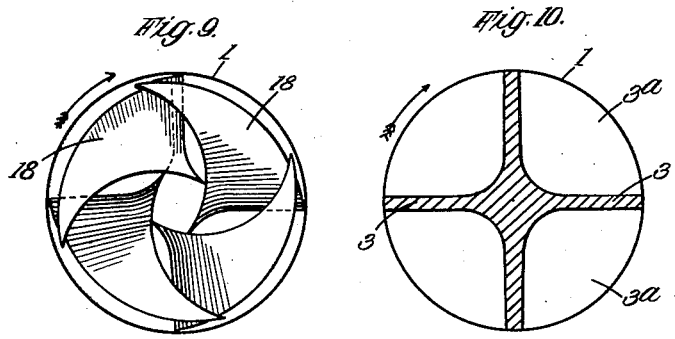
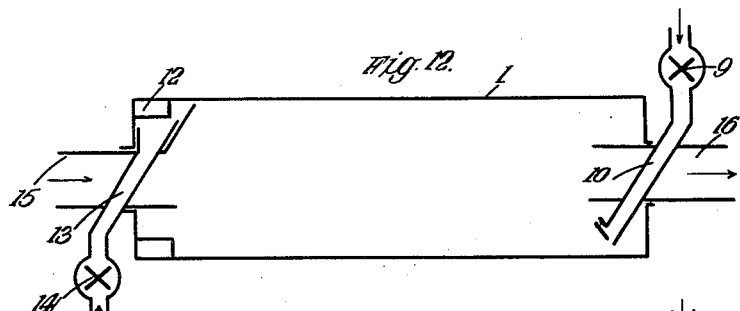
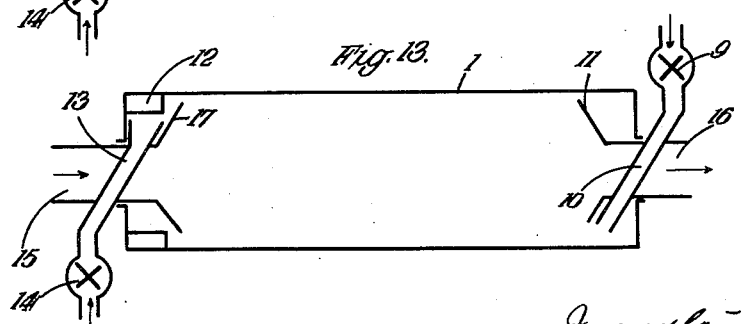

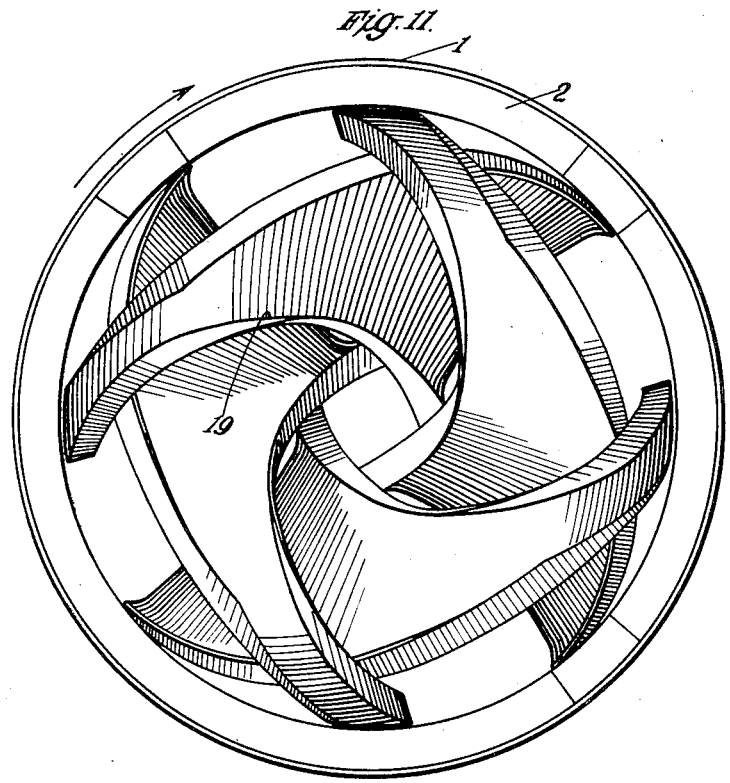
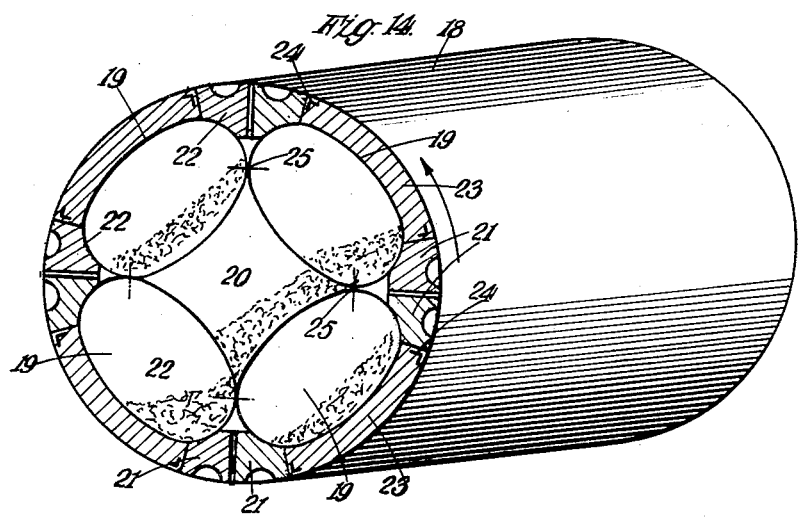

Patented May 9, 1933

1,908,651

UNITED STATES PATENT OFFICE

HARALD NIELSEN, OF BROMLEY, ENGLAND, ASSIGNOR TO SENSIBLE HEAT DISTILLATION LIMITED, OF YORK MANSION, WESTMINSTER, ENGLAND, A COMPANY OF GREAT BRITAIN

APPARATUS FOR THE DISTILLATION OF SOLID CARBONIZABLE FUEL

Application filed June 29, 1929, Serial No. 374,790, and in Great Britain July 30, 1928.

This invention relates to rotary inclined retorts for the distillation or heat treatment of carbonaceous and other fuel such as coal, lignite, brown coal, peat, wood, shale and the like, of the kind in which a gaseous medium is brought into contact with the fuel to be treated, and refers more particularly to rotary inclined retorts in which the interior of the retort chamber is divided into a number of separate passages or chambers for the purpose of enlarging the surface exposed to the influence of the heating medium.

According to one feature of the present invention the retort chamber is divided longitudinally into compartments which are either bounded by the interior wall of the retort or, alternatively, a plurality of separate and readily replaceable tubular members are provided which are independent of, but located within, the outer or interior wall of the retort and which are of circular, ovoid, polygonal or like configuration.

According to a further feature of the present invention the ends of the passages or chambers into which the interior of the retort is divided are provided with means, such as blades or scoops for the purpose of feeding the material into the said chambers or compartments and/or delivering or assisting in delivering the material therefrom.

According to another feature of the present invention the retort is provided at its exit end with means, such as scoops or shovels, which, during the rotation of the retort, serve to pick up the material which has undergone distillation or heat treatment and feed the same through a stationary chute or a discharge opening or exit at the discharge or lower inclined end of the retort.

According to a still further feature of the present invention the retort is provided at either its inlet or its discharge end, or at both, with stationary gas inlet and outlet pipes, the ends of which are expanded to form, or which are provided with, conical extensions inside the retort for the purpose of controlling the degree of swirling movement imparted to the heating gases. In such cases the inlet and the discharge chutes through which the material enters or leaves the retort may be located behind these conical gas inlets and outlets so as to protect the material from the action of the hot gases at these points.

In order that the said invention may be clearly understood and readily carried into effect the same will now be described more fully with reference to the accompanying drawings, in which, Figure 1 is a sectional elevation of a rotary inclined and internally heated retort constructed according to one form of the present invention and embodying a number of the aforesaid features.

Figure 2 is a sectional end view, on an enlarged scale, showing the scoops or shovels which lift the material when it reaches the discharge end of the retort and feed the same to the stationary discharge chute.

Figure 3 is a sectional elevation of the discharge end of the rotary retort shown at Figure 1 showing more clearly the devices for discharging the spent material from the retort.

Figure 4 is a section on the line 4—4 of Figure 3.

Figure 5 is a sectional view of a retort fitted with a slightly modified form of charging and discharging device.

Figure 6 is a sectional end view on the line 6—6 of Figure 5, and Figure 7 is a section on the line 7—7 of Figure 5.

Figure 8 is a sectional view showing the discharging end of a retort fitted with a slightly modified arrangement of internal passages and also with a modified form of discharging device.

Figure 9 is a sectional end view on the line 9—9 of Figure 8, and

Figure 10 is a section on the line 10—10 of Figure 8.

Figure 11 is a sectional end view of a further form of discharging device.

Figures 12 and 13 are diagrammatic vertical sectional views of the retort showing different arrangements of the gas inlet and outlet pipes fitted with the aforesaid conical extensions for controlling the swirling movement of the gas as it enters or leaves the retort, and Figure 14 is a sectional end view partly in perspective of part of a retort fitted with a modified and preferred form of internal passages.

Referring to Figures 1 to 13, 1 is the outer wall of the retort which is lined with firebrick 2. 3, 3 are the plates which divide the interior of the retort chamber into four compartments 3a, 3a. 4, 4 are the helically twisted plates at the entrance to the compartments 3a, 3a which serve to feed the material into the said compartments, and 5, 5 are the helically twisted plates which serve, or assist, in removing the material from the lower or discharge end of the retort. These helically twisted plates 4, 4 and 5, 5 as shown more clearly in the end views at Figures 4, 6 and 7, also assist in maintaining a predetermined depth of material within each compartment, the depth being determined by the width of said helically twisted plates. Instead of having the form shown at Figures 1 to 4 the plates may be formed as shown at Figures 5, 6 and 7. Alternatively, the twisted plates at the discharge end of the retort may have the form shown at Figures 8, 9 and 11. The rotary retort is provided with runner bands 6, 6, and a continuous movement of rotation is imparted to the retort by means of a motor 7, pinion 8 and circular rack 9. The retort is inclined as shown so that there is a gravity feed of material from the inlet to the discharge end thereof. The material which is to be treated enters the retort through a rotary valve 9 and passing down a chute 10 enters the retort, a conical plate 11 (Figures 1, 5 and 13) being located in front of the chute 10 so as to protect the entering material from direct contact with the hot gases. A series of fixed scoops or shovels 12, 12, are arranged around the interior of the retort at the discharge end thereof, these scoops or shovels being adapted to pick up the solid material which reaches the discharge end of the retort and to lift and feed the same into the discharge chute 13 where the carbonized residues are removed through a rotary valve 14. The hot gases enter the retort at 15 and leave the same carrying in suspension the vapors and gases yielded up during the heat treatment at the end 16.

In operation a continuous movement of rotation is imparted to the retort and the fuel which is to be treated enters the retort through the rotary valve 9 and chute 10, where partly owing to gravity and partly owing to the action of the helically twisted plates 4, 4, it enters each of the compartments 3a, 3a, when, during the rotation of the retort these compartments come successively in front of the discharge end of the chute 10. The hot gases used as the distilling medium and which may be combustion gases, producer gas, or superheated water gas, enter the retort at the end 15 thereof and flow through the compartments 3a, 3a in contraflow to the material undergoing distillation. Owing to the construction of the plates 4, 4, and 5, 5, a certain level of material will be maintained within each of the compartments 3a, 3a, and a very effective contact will be ensured between the material undergoing treatment and the hot gases used as the distilling medium. When the carbonized residue reaches the discharge end of the retort the helically twisted plates 5, 5, assist in removing the same from each of the compartments, 3a, 3a, when, during the rotation of the retort, each of these compartments reaches its lowermost position. The carbonized residue is then picked up by the scoops 12, 12, and is raised until it reaches and enters the discharge chute 13 by which it is discharged from the retort through the rotary valve 14. In addition to the conical plate 11 provided at the entrance to the retort a corresponding plate 17 (Figure 13) can be provided in front of the discharge chute 14 as shown at Figure 13, or conical plates 11 and 17 can be located both at the entrance and the discharge ends of the retort (Figure 13). The conical plate 11 is hollow so as to have an opening 11' communicate with the interior of the retort.

The twisted or helical plates at the exit ends of the chambers 3a, 3a, may also have the form shown at 18 (Figures 8 and 9) or 19 (Figure 11).

Referring to Figure 14, 18 is a rotary retort of circular cross-section and 19, 19, are four tubular members of ovoid configuration which divide up the retort chamber into five compartments, four of the compartments being constituted by said tubular members and the fifth compartment 20 being formed at the centre of the retort by the abutting sides of the said members. The retort is composed of an outer metal wall 18 lined partly with firebrick blocks 21, 21, which are formed in independent sections extending longitudinally of the retort and which have curved portions 22, 22, which form seatings for the tubular members 19, 19, while also assisting in holding them in position within the retort chamber. Slag wool or other suitable nonconducting material 23 is also provided located within the space between the outer wall 18 of the retort, the firebrick blocks 21, 21, and the tubular members 19, 19. The firebrick blocks 21, 21, may be kept in position in relation to the outer wall of the retort in any suitable manner, for example, by means of angle irons 24, 24, and may be made in sections so as to facilitate removal and replacement. The tubular members may be bolted or otherwise secured to one another at the points 25, 25, where they abut against one another. The tubular members 19, 19, are thus quite independent of the outer retort wall 18 so that any tubular member, or any section of a tubular member, can be removed by detaching it from contiguous tubular members and, in cases where it is built up of separate parts, dismantling it. The end of each tubular member may be located loosely within the end of a contiguous section so that expansion in the longitudinal direction of the retort is provided for, while the slag wool allows for radial expansion of the tubular members. The tubular members, however, may be corrugated either longitudinally or transversely, to facilitate expansion either radially or longitudinally of the retort. Means may be provided, for example, inclined or helically twisted plates, which are of similar construction to impeller or propeller blades, to impart a whirling movement to the heating gases and bring the same into more intimate contact with the material undergoing treatment within each tubular member. These helically twisted plates may also serve to feed the material into the compartments at the inlet end of the retort and remove the same from the outlet end of the tubular members. The twisted plates at the outlet end of the compartment may be so constructed as to prevent the material from falling from any particular compartment until the retort, during its rotation, brings the said compartment from which the material is to be removed to the lower portion of the retort. A suitable arrangement of the aforesaid twisted plates has previously been described with reference to Figures 1 to 13.

As the retort revolves, the material will be subjected to heat treatment not only directly by contact with the separate gas streams passing therethrough but also indirectly by radiation and conduction from the tubular members due to the heat transmitted thereto by the gases which pass externally of the said members. As the retort revolves the material will roll round within each compartment thus preventing the material falling such a considerable distance as would cause excessive breaking or disintegration thereof, while the formation of dust will also be reduced or avoided. The provision of twisted plates at the outlet end of the tubular members will also prevent the material falling through a distance equal to the diameter of the retort, while also serving to prevent the formation of dust and the breaking up of the material undergoing treatment.

I claim:

1. In an apparatus for the distillation of solid carbonizable fuel, the combination of a longitudinally inclined, elongated rotary retort mounted for rotation on an axis longitudinally thereof and passing through the same, and which is interiorly divided into a plurality of parallel chambers extending lengthwise of the retort and spaced inwardly of said retort from the upper end thereof, means for admitting heating gas at the lower end of the retort to the interior of each of said chambers and in contact with and in contraflow to the material passing through each said chamber, means for supplying fuel to be distilled to the retort between the upper end thereof and the adjacent ends of said chambers, separate means for feeding said fuel into each of said parallel chambers, said separate means being situated between the upper end of the retort and the adjacent ends of said chambers, means situated at the lower end of said retort for feeding solid fuel from each of said chambers to an outlet, said outlet being situated between the lower adjacent ends of said chambers and the lower end of the retort, and separate means for discharging carbonized residue externally of the retort from said outlet, said separate means being situated between the lower adjacent ends of said chambers and the lower end of the retort.

2. In an apparatus for the distillation of solid carbonizable fuel, the combination of a longitudinally inclined, elongated rotary retort mounted for rotation on an axis longitudinally thereof and passing through the same, and which is interiorly divided into a plurality of parallel chambers extending lengthwise of the retort and spaced inwardly of said retort from the upper end thereof, means for admitting heating gas at the lower end of the retort in contraflow to the fuel passing through the retort, means for supplying fuel to be distilled to the retort between the upper end thereof and the adjacent ends of said chambers, an outlet conduit for vapors and gases being provided at the upper end of the retort, and a hollow conical-shaped member within the retort and communicating with said outlet conduit and with said retort, the wall of said member being adapted to shield the fuel fed into the retort at the upper end thereof from a current of gas passing from said outlet conduit.

3. In an apparatus for the distillation of solid carbonizable fuel, the combination of a longitudinally inclined, elongated rotary retort mounted for rotation on an axis longitudinally thereof and passing through the same, and which is interiorly divided into a plurality of parallel chambers extending lengthwise of the retort and spaced inwardly of said retort from the upper end thereof, means for feeding fuel to be distilled to the retort into the elevated end of the retort, the retort having at its upper end an outlet conduit for vapors and gases, and a hollow conical-shaped member in the space between the fuel inlet to the retort and the adjacent ends of said chambers and communicating with said outlet conduit and with said retort, for the purpose described.

In testimony whereof I have affixed my signature.

HARALD NIELSEN.